Oct. 21, 1969  R. P. WOOD  3,473,512
COATING DIES

Filed April 22, 1968  2 Sheets-Sheet 1

INVENTOR.
RICHARD P. WOOD
BY
*Starlin & Overman*
ATTORNEYS

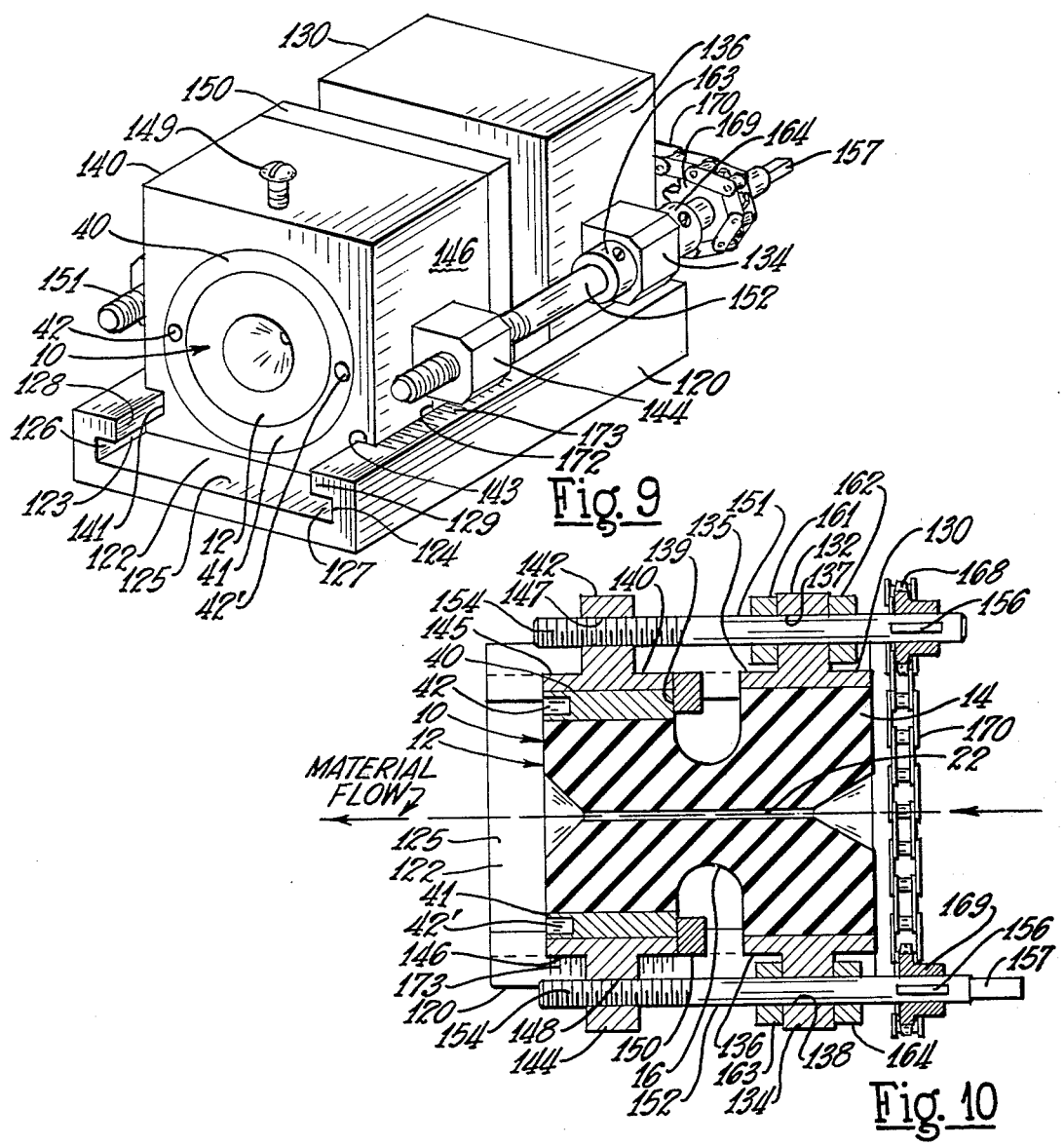

3,473,512
COATING DIES
Richard P. Wood, Granville, Ohio, assignor to Owens-Corning Fiberglas Corporation, a corporation of Delaware
Continuation-in-part of application Ser. No. 531,268, Mar. 2, 1966. This application Apr. 22, 1968, Ser. No. 722,920
Int. Cl. B05c 11/02, 3/02
U.S. Cl. 118—125  5 Claims

ABSTRACT OF THE DISCLOSURE

A die having an elastic body with a passageway extending therethrough and means for stretching and twisting the body to modify the cross-sectional size of the passageway.

---

This application is a continuation-in-part of my application, Ser. No. 531,268, filed Mar. 2, 1966, now U.S. Patent No. 3,390,662.

Background of the invention

The present invention is directed to a coating or impregnating die, and more particularly to a die which is capable of varying its effective die passage to desired diameters employed to coat or impregnate strands, yarns, rovings and various other types of strands of glass fibers, natural or other synthetic fibers, in addition to coat monofilaments such as wire and longitudinal tapered elements.

The ability to closely control thickness, and hence weight, of coating material covering strands and the like is highly desirable from both a technical and economy standpoint. One cannot always, however, calculate in advance the die passage diameter required to accomplish a desired coating result. There are many variables which influence coating, such as the particular characteristics of a coating material, variations in its viscosity and particular pickup characteristics of a strand to be coated.

Conventional fixed diameter dies may cause difficulties and for many applications are limited in their use. When they are employed in a coating process, attainment of a desired coating result may require use of more than one die. Change from a die of one diameter to one of another diameter is time consuming and interrupts the process. Further, there are times when a uniform coating is desired to be applied over irregular shapes or tapered shapes. Moreover, varying thickness of a coating along the length of strands, yarns and monofilaments, etc. are at times desired. Conventional fixed diameter passage dies cannot accomplish these types of coatings. The die of the present invention is, however, admirably suited to obtain excellent coating results in a wide variety of these applications.

Summary of the invention

An object of the present invention is to provide a die which overcomes the difficulties enumerated hereinabove by being adjustable to controlled variations in effective passage diameter.

Another object of the invention is to provide a die having an adjustable diameter passage to correct for die passage wear.

Still another object of the invention is to provide a die which is easily threaded by reason of its large passage diameter during threading, yet capable of reduced effective passed diameter during operation.

A further object is to provide a die capable of being adjusted in diameter while strands are continuing to be passed therethrough, thereby permitting adjustments in the diameter of the coatings on the strands without interruption in the operations.

The objects are attained using any suitably shaped die body fabricated from elastic or elastomeric material having at least one portion thereof which is a zone of reduced cross-sectional area so that the body may be twisted or wrung in the reduced cross-sectional area zone by rotation of one or both portions of the body located on opposite ends of the zone. In other words, the body portions located on opposite ends of the zone rotate relative to each other. Twisting imparts stresses, which by reason of the reduced amount of body material becomes concentrated in the zone. This, in a sense, causes a choking of that portion of the die passage extending through the reduced cross-sectional area zone. The greater the twist applied, the smaller the restricted portion of the passage becomes. Thus, the diameter of the die passage within the zone, the effective passage diameter, can be closely controlled by the amount of twist imparted.

Other objects and advantages of the invention will become apparent as the invention is hereinafter described in more detail with reference made to the accompanying drawing in which:

Description of the drawings

FIGURE 9 is a view in perspective of modified apparatus according to the principles of the invention.

FIGURE 10 is a plan view in section of the apparatus shown in FIGURE 9.

Description of the preferred embodiments

Figure 1:
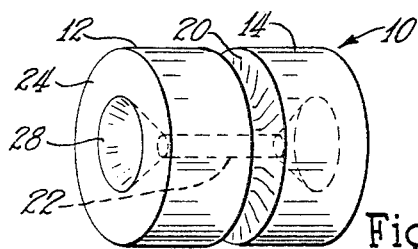
FIGURE 1 is a perspective view of a die body incorporating the principles of the present invention.
Figure 2:
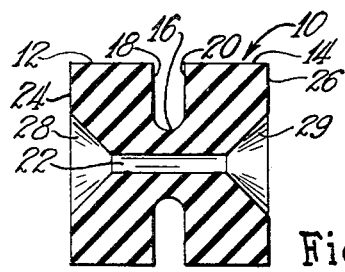
FIGURE 2 is a longitudinal cross section view of the die body illustrated in FIGURE 1.

Referring to FIGURES 1 and 2, the die body of the present invention employs a zone of smaller cross section than die body portions adjacent zone ends. The zone extends along the length of a passage which runs through each die body. The zone may be any shape, such as a cylinder or the like, just so long as the zone is of smaller cross section than die body portions adjacent its ends.

FIGURES 1 and 2 illustrate a preferred embodiment of the invention using a one piece die body 10 fabricated from suitable elastic or elastomeric material such as polyurethane and having generally the shape of a dumbbell. Larger end regions 12 and 14 are squat cylinders in form. External end faces 24 and 26 of end regions 12 and 14 respectively may be flat surfaces or be fashioned with counterbored areas 28 and 29 or the like. A central zone 16 of reduced cross-sectional area extends from opposing internal faces 18 and 20 of larger end regions 12 and 14 respectively. Zone 16 comprises a longitudinal arcuate surface extending away from opposing faces 18 and 20 at a maximum cross-sectional area and proceeding in ever decreasing cross section to a central constituent portion of a minimum cross section. Die bodies fabricated using varying maximum and minimum cross sections may be employed to obtain desired die operating characteristics.

A longitudinal passage 22 extends through the length of body 10. Passage 22 may open onto flat surfaces of external faces 24 and 26 or into counterbored areas 28 and 29 if counterbored areas are provided. While not essential, improved operation results when passage 22 extends along the longitudinal axis of body 10, and is preferred. Passage 22 is constructed using any suitable diameter. The diameter may be varied along with dimensions of central zone 16 to accomplish various desired die operating characteristics on large or smaller diameter strands and the like.

Figure 3:
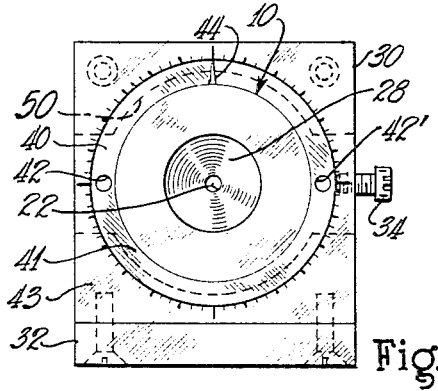
FIGURE 3 is a rear elevation view of apparatus incorporating and adapted to twist the die body of FIGURE 1.
Figure 4:
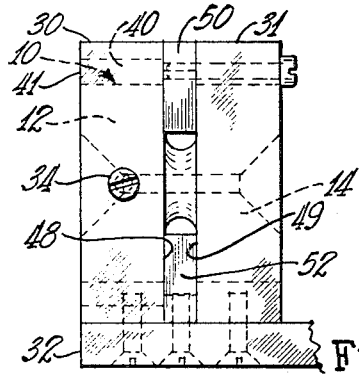
FIGURE 4 is a side elevation view of the apparatus shown in FIGURE 3.

Referring to FIGURES 3 and 4, the end regions of die body 10 are held in suitable die body twisting apparatus which is employed to twist central zone 16 of reduced cross section. The apparatus operates to rotate one end region in relation to the other by holding one end region stationary yet permitting the other end region to rotate. While apparatus may be employed which permits rotation of both ends, apparatus providing rotation of one end is preferred in actual operation.

Prior to being mounted in the twisting apparatus, however, the end to be rotated, e.g. end region 12, is inserted into a journal tube 40 in snug-fit relation and bonded or otherwise appropriately secured therein. Preferably, the length of tube 40 is the same as that of the end region secured therein so that external faces are flush with the ends thereof.

Die twisting apparatus shown in FIGURES 3 and 4 comprise several elements on a base 32. These elements comprise a forward upstanding housing 31, yokes 50 and 52 and an after upstanding housing 30.

Forward upstanding housing 31 is designed to hold one end region, e.g. end region 14, stationary. While housing 31 is shown generally as a cube, it may be any suitable shape. Housing 31 has constructed therethrough an opening of suitable size to accept an end region in snug-fit relation. Such end region is bonded or otherwise suitably secured therein and is held stationary. Housing 31 stands rigidly secured to base 32.

After housing 30 rotatably holds journal tube 40 and the end region held therein, e.g. region 12. Housing 30 is at a distance from housing 31 equal to the length of the reduced cross sectional area portion 16 and is secured to the base 32. While housing 30 is depicted generally as a cube, any suitable shape may be used. Housing 30 is constructed with an opening therethrough and in which tube 40 is rotatably held. Additionally, one side of housing 30 contains a threaded opening extending transverse to tube 40 and into which a set screw 34 is threaded so that one end thereof may be advanced to press against a portion of the length of the tube 40, thereby permitting tube 40 to be securely held in a rotated position during coating operations. Tube 40 is free to rotate through 360 degrees in either direction as many times as is required to obtain a desired die operation; however, die bodies may be employed which have dimensions requiring less than one revolution to obtain desired effective passage diameters.

End surface 41 of tube 40 has holes 42 and 42' for use with a span wrench or other appropriate rotating device to turn tube 40 to desired rotated positions. Further, end surface 41 has an indicator mark 44 thereon which matches against scale marks appearing on the external face 43 of housing 30. Indicator 44 and scale marks cooperate to show an amount of rotation given to tube 40.

While die body 10 operates well allowing unrestricted horizontal movement of tube 40 within housing 30, a preferred embodiment employs retaining means to preclude horizontal movement of tube 40. Interjected between housings 30 and 31 are yoke elements 50 and 52 which are in abutting relationship with internal opposing faces 48 and 49 of housings 30 and 31 respectively. Yoke 52 is positioned on base 32 with the arcuate portion thereof disposed upwardly and is secured thereto. Yoke 50 is positioned directly above yoke 52 and is secured to housing 31. Yoke 50 has its arcuate portion disposed downwardly. Hence, the arcuate surfaces of yokes 50 and 52 describe a portion of a circle circumscribing reduced area portion 16 and having a slightly smaller diameter than the outside diameter of tube 40. Yokes 50 and 52 prevent horizontal movement of tube 40, and the end region held therein, along the longitudinal axis of die body 10.

Figure 5:
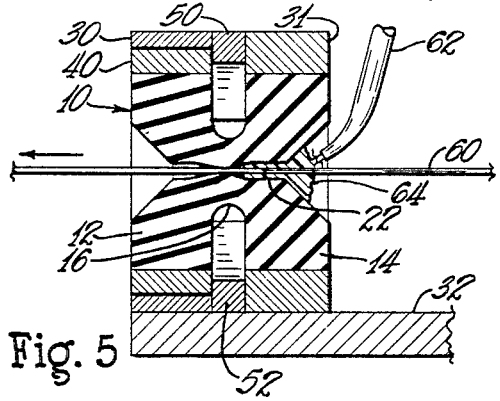
FIGURE 5 is a longitudinal cross section view of the die body of FIGURE 1 and apparatus of FIGURES 3 and 4 showing one way in which coating material might be supplied to the die body for coating a strand.

Referring now to FIGURES 3 and 5, die body 10 is readied for operation by threading a strand 60 or the like through passage 22 prior to subjecting central portion 16 to stress by rotating end region 12.

A desired effective passage diameter may be obtained by rotating tube 40. A span wrench or any other suitable device is inserted into holes 42 and 42' and turned to rotate tube 40 until a desired effective die passage diameter of body 10 is attained. Tube 40 is locked in desired position by advancing set screw 34 tightly thereagainst. Because end region 12 is secured within tube 40, rotation of tube 40 also rotates end region 12 relative to end region 14, which is held stationary by housing 31. Rotation causes a twisting of the central zone 16, which induces a concentration of stresses within the zone material. Thus, in a sense, a portion of passage 22 is choked or constricted to reduce its diameter of passage 22 in zone 16.

Coating material 64 is applied to strand 60 by suitable means 62 at or before its entrance into passage 22. As shown in FIGURE 5, strand 60 is pulled through passage 22 from right to left. Coating material such as polyvinyl chloride or the like may be used. Further, any fluid suitable for either coating or impregnating strands may be employed with the die of the invention. Moreover, any appropriate coating method may be used, such as conventional strand dipping accomplished prior to strand 60 entering passage 22. Excess coating material may drop into an appropriate collection means (not shown).

Figure 6:
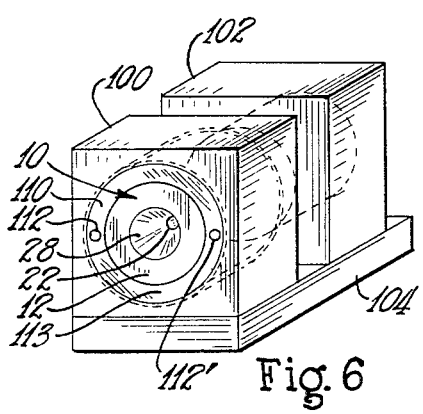
FIGURE 6 is a perspective view of a modified die twisting apparatus incorporating a die body of the invention like that shown in FIGURE 1.
Figure 7:
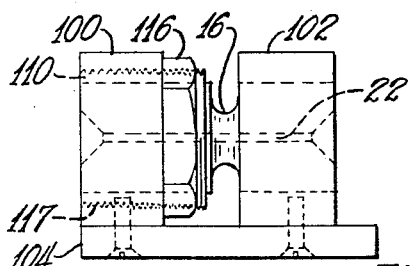
FIGURE 7 is a side elevation view of the apparatus shown in FIGURE 6.

FIGURES 6 and 7 illustrate modified die twisting apparatus capable of use with die body 10 permitting rotation of one die body end region. The apparatus allows controlled horizontal movement of the rotatably mounted die body end region along the longitudinal axis of die body 10 as the end region is rotated. Prior to mounting in the twisting apparatus, however, the end region, e.g. end region 12, is inserted into a tube 110 having outside threads thereon and is bonded or otherwise appropriately secured therein. Threads on tube 110 permit threading thereon of a nut 116, operation of which is hereinafter described. Furthermore, end surface 113 of tube 110 has holes 112 and 112' therein suitable for use with a span wrench or the like.

Forward housing 102 maintains end region 14 in a stationary manner as described hereinabove regarding housing 31. Further, it is secured to base 104 in the same manner as housing 31 is secured to base 32.

After housing 100 holds end region 12 so that it may both rotate and move horizontally along the longitudinal axis of die body 10. Housing 100 is located at a distance from housing 102 somewhat greater than the length of central reduced cross sectional area zone 16 so as to allow room for proper operation of tube 110 and nut 116. While its shape is generally that of a cube, any suitable shape may be employed. Moreover, housing 100 is constructed with a threaded opening 117 extending therethrough and into which tube 110 is threaded. Thus, when tube 110 is rotated, it is moved horizontally by the threads of tube 110 in the threads of opening 117.

The desired effective passage diameter of die passage 22 is attained rotating tube 110. A span wrench or other suitable device is inserted into holes 112 and 112' to rotate tube 110. Tube 110 is rotated until a desired effective passage diameter is obtained and is locked in position by appropriately advancing nut 116 tightly against housing 100. Because an end region is secured within tube 110, e.g. end region 12, rotation of tube 110 also rotates end region 12 relative to end region 14, which is held stationary in housing 102. Furthermore, rotation of tube 110 moves end region 12 along the longitudinal axis of die body 10 as tube 110 is advanced by the meshing threads of tube 110 and opening 117. The horizontal movement of end region 12 along the longitudinal axis of die body 12 acts, in a sense, in cumulative manner to twisting stresses. Greater passage diameter variations may be accomplished with less twisting.

Figure 8:
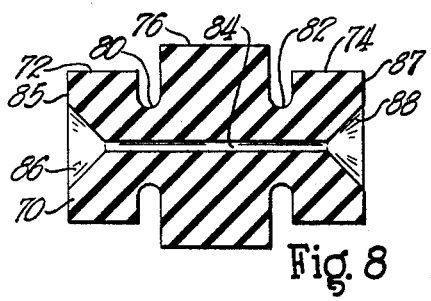
FIGURE 8 is a longitudinal cross section view of a modified die body incorporating the principles of the present invention.

FIGURE 8 illustrates a modified die body. Modified die body 70 is fabricated from one piece of suitable elastic or elastomeric material and has two squat cylinder shaped end regions 72 and 74. Further, a squat cylinder shaped portion 76 is located centrally on body 70 and can be either smaller or larger in diameter than end regions 72 and 74. Central portion 76 is connected to end regions 72 and 74 by small cross sectional area zones 80 and 82 respectively. Regions 72 and 74 are smaller in cross section than portion 76. The shape of portions 80 and 82 are in its preferred embodiment as described hereinabove regarding reduced cross sectional area zone 16 of die body 10. Zones 80 and 82 may be any suitably shaped reduced cross sectional zone, e.g. a cylinder or the like. A longitudinal passage 84 is drilled, or otherwise appropriately constructed, in body 70. Passage 84 extends along the longitudinal axis of the body 70 and opens into counterbored areas 86 and 88, which may be cut in external end faces 85 and 87 of end regions 72 and 74 respectively, or directly onto flat surfaced external end faces 85 and 87 if no counterbored areas are provided. Die passage diameter control occurs at two zones and may be accomplished in two ways. First, one may rotate center portion 76 and hold end regions 72 and 74 stationary. Apparatus similar to that described hereinabove and used to hold and rotate a portion of die body 10 may be used to cause a twisting of the material of sections 80 and 82. Here, however, end regions 72 and 74 are held stationary and portion 76 is rotatably held. Rotation of portion 76 causes modification of the diameter of passage 84 in the portions extending through zones 80 and 82. Secondly, center portion 76 may be held stationary and end regions 72 and 74 may be rotated either together or separately in the same or opposite directions to constrict passage 84. If operated independently, restrictions of different diameters may be obtained in passage 84 extending through zones 80 and 82.

FIGURES 9 and 10 illustrate modified die coating or impregnating apparatus according to the principles of the invention. The apparatus as illustrated uses the one piece die body 10 of elastic or yieldable material such as shown in FIGURES 1 and 2 and includes a base 120, the journal tube 40, a forward housing 130, a rearward housing 140, and means for moving the rearward housing 140 with respect to the forward housing 130 to stretch the body 10 along its longitudinal axis.

An end of the die body 10, e.g. end region 12, is inserted into the journal tube 40 in snug-fit relation and bonded or otherwise appropriately secured therein. Preferably, the length of the journal tube 40 is the same length as that of the end region secured therein so that the external faces are flush with the ends thereof.

Forward housing 130 is designed to hold one end region of the die body 10, e.g. end region 14, stationary. While the housing 130 is shown generally as a cube shape, it may be of any suitable shape. The housing 130 has constructed therethrough an opening of suitable size to accept an end region in snug-fit relation. Such end region is bonded or otherwise suitably secured therein to be held stationary. The housing 130 stands rigidly secured on the base 120 and possesses lugs 132 and 134 extending from vertical walls 135 and 136 respectively of the housing 130. Passageways 137 and 138 open through the lugs 132 and 134 respectively.

The rearward housing 140 rotatably holds the journal tube 140 and the end region held therein, e.g. end region 12. When the apparatus of the invention is not used, the rearward housing 140 is at a distance from the forward housing 130 equal to the length of the reduced cross-sectional area portion 16 of the die body 10. While the rearward housing 140 is shown generally as a cube, any suitable shape may be employed. The rearward housing 140 is constructed with an opening therethrough in which the journal tube 40 and the end regions of the die body 10 held therein are rotatably held. Lugs 142 and 144 extend from the vertical walls 145 and 146 of the rearward housing 140. Tapped passageways 147 and 148 open through the lugs to extend in line with the passageways 137 and 138 respectively. Additionally, one side of the rearward housing 140 has a threaded opening extending transverse to the journal tube 40 into which a set screw 149 threads so that one end of the screw 149 may be advanced to press against a portion of the length of the journal tube 40, thereby permitting the journal tube 40 to be securely held in a desired rotated position during coating operations. As in the case of the apparatus shown in FIGURES 3 through 5 the journal tube 40 is free to rotate through 360 degrees in either direction as many times as is required to twist the die body 10 and obtain a desired die operation, i.e. desired effective passageway diameter; however, die bodies may be employed that have dimensions requiring less than one revolution to obtain desired effective passageway diameters.

Associated with the rearward housing 140 in a keeper plate 150 having an opening smaller than the outside diameter of the journal tube 40. Suitable means removeably fixes the keeper plate 150 to the internal face 139 of the housing 140. When the apparatus moves to stretch the die body 10, the keeper plate 150 retains the journal tube 40 and its associated end region to move with the rearward housing 140.

The end surface 41 of the journal tube 40 has holes 42 and 42' for use with a span wrench or other rotating device to turn the journal tube 40 to desired rotated positions.

The rearward housing 140 is slideably mounted on the base 120 to stretch the die body 10. As illustrated in FIGURES 9 and 10 the rearward housing 140 engages a guideway 122, which includes vertical walls 123 and 124 and a floor 125. Channels or slots 126 and 127 extending along the length of the vertical walls 123 and 124 respectively provide overhanging extensions 128 and 129. Suitable slots 141 and 143 along the sidewalls of the rearward housing 140 provide means for cooperative engagement of the housing 140 with the guideway 122. As the rearward housing 140 moves along the guideway 122 away from the forward housing 130, the rearward housing 140 carries the journal tube 40 and end region held therein to stretch or extend the length of the die body 10 along its longitudinal axis.

As the die body 10 stretches along its longitudinal axis, the size of the die passageway modifies at a zone at its ends. Stretching the die body 10 induces a concentration of stresses along its length to deform the material located therein, e.g. with the zone 16. Thus, in a sense, a portion of the passageway 22 deforms, e.g. "necks down," in a zone between the ends of the passageway 22, e.g. zone 16.

The apparatus provides means for moving the rearward housing 140 along the guideway 122, i.e. towards and away from the forward housing 130. As shown in FIGURES 9 and 10 the apparatus moving the housing 140 includes a pair of rods 151 and 152 associated with both the forward housing 130 and the rearward housing 140. The rods 151 and 152 extend in spaced relation along the vertical sides of the housings 130 and 140 through the passageway of each lug, i.e. lugs 132, 134, 142 and 144. The rod 151 extends through passageways 137 and 147 of the lugs 132 and 142; the rod 152 extends through the passageways 138 and 148 of the lugs 134 and 144. One end of both the rods has threads 154 that engage the cooperating threads of the tapped passageways 147 and 148. The other ends have keys 156. The rod 152 terminates with a square end 157, which can engage a suitable means for rotating the rod 152. Collars 161 and 162 and collars 163 and 164 are tight on the rods 151 and 152 respectively to hold the rods in fixed relation with the lugs 132 and 134.

As rod 152 rotates so does rod 151. The keys 156 securely establish sprockets 168 and 169 on the rods 151 and 152. A drive chain 170 connects the sprockets. As the rod 152 rotates the chain 170 rotates the rod 151 the same amount.

As the rods 151 and 152 rotate, they move the rearward housing 140 in the guideway 122. Depending upon the direction of rotation the rods move the housing 140 towards or away from the housing 130. Such movement is the result of the cooperating threads 154 of the rotating rods 151 and 152 and the threads of the passageways 147 and 148 (of the lugs 142 and 144), which can advance the housing 140 away from the housing 130 to stretch the die body 10 along its longitudinal axis.

An indicator mark 172 on the vertical wall 146 of the rearward housing 140 matches against scale marks on the upper surface of the base 120 to indicate the amount of stretch imparted to the die body 10.

In operation, the cross sectional area of the passageway 22 may be modified at a zone between the ends of the passageway 22 by merely stretching. When the rods 151 and 152 rotate to advance the rearward housing 140 away from the forward housing 130, then die body 10 stretches along its longitudinal axis. The zone 16 and passageway portion located substantially within such zone tends to deform by necking down to reduce cross sectional area of the passageway in the zone.

A modified passageway diameter may be obtained by first rotating the tube 40. A span wrench or other suitable device is inserted into hole 42 and 42' and turned to rotate tube 40 and twist the die body 10 until the desired effective passageway diameter is attained. Subsequent stretching through movement of the rearward housing 140 away from the forward housing 130 provides additional modification of the cross sectional area of the passageway.

A desired effective passageway size may be obtained by first stretching the die body 10 along its longitudinal axis and subsequently rotating the tube 40 to twist the die body 10, again using a span wrench or other suitable device inserted into the holes 42 and 42' of the journal tube 40.

Other die bodies such as the modified die body shown in FIGURE 8 may be stretch or stretched and twisted to modify its die passageway 84.

While the invention has been described in connection with coating strands, yarns and monofilaments such as wire, etc., the invention may be employed to coat longitudinal tapered elements. Coatings of tapered elements may be accomplished by programmed operation of apparatus to stretch and/or twist a die body and thereby vary effective passage diameter in relation to the taper of the longitudinal element to be coated.

Similarly, varying the amount of coating applied to a strand, yarn, monofilament or the like may be accomplished to obtain a tapered coating or repeated increase and decrease in material applied along the length thereof. One need only vary the amount of stretch and/or twist imparted to the die body in a predetermined manner as the element to be coated is passed therethrough.

Thus, it can be seen that the invention as described constitutes an easily used and useful coating device which effectively overcomes difficulties inherent in conventional fixed passage dies.

I claim:
1. A die comprising:
    a body of elastic material, the body having a passageway extending therethrough and having at least one portion thereof which is a zone of reduced cross-sectional area surrounding the passageway between the ends of the passageway, the diameter of the passageway being reduced in cross-sectional size in the vicinity of the zone of reduced cross-sectional area when the body is stretched; and
    means holding body portions adjacent to the opposite sides of the zone for stretching the die body in the zone.
2. A die comprising:
    a body of elastic material having a passageway for movement of linear material therethrough and having at least one portion thereof which is a zone of reduced cross-sectional area surrounding the passageway between the ends of the passageway, the passageway being reduced in cross-sectional size in the zone when the body is stretched; and
    means for stretching the body to reduce the passageway in the zone.
3. A die according to claim 2 further including means for stretching the body at a rate to reduce the cross-sectonal area of the passageway in the zone in a predetermined manner as the linear material moves through the passageway.
4. A die for linear material comprising:
    a body of yieldable material having a passageway for movement of linear material therethrough, the body having a portion that is a zone of reduced cross-sectional dimension between the ends of the passageway; and
    means for extending the length of the yieldable body to modify the cross-sectional area of the passageway at the zone between the ends of the passageway.
5. A die according to claim 4 further including means for twisting the body to modify the cross-sectional area at the zone.

References Cited

UNITED STATES PATENTS

| | | | |
|---|---|---|---|
| 1,943,818 | 1/1934 | Fantone et al. | 118—405 X |
| 2,341,450 | 2/1944 | Knaus | 118—405 |
| 2,657,414 | 11/1953 | Miller et al. | 15—210.2 |
| 3,032,812 | 5/1962 | Van Riper | 15—210.2 X |
| 3,155,543 | 11/1964 | Marzocchi et al. | 118—405 |

WALTER H. SCHEEL, Primary Examiner

JOHN P. McINTOSH, Assistant Examiner

U.S. Cl. X.R.

118—405